United States Patent
Strauβ et al.

(10) Patent No.: US 9,062,754 B2
(45) Date of Patent: Jun. 23, 2015

(54) GEAR UNIT

(75) Inventors: Dietmar Strauβ, Deutschland (DE);
Ingo Schütterle, Deutschland (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 152 days.

(21) Appl. No.: 13/260,539

(22) PCT Filed: Mar. 11, 2010

(86) PCT No.: PCT/EP2010/001536
§ 371 (c)(1),
(2), (4) Date: Sep. 26, 2011

(87) PCT Pub. No.: WO2010/108599
PCT Pub. Date: Sep. 30, 2010

(65) Prior Publication Data
US 2012/0031214 A1 Feb. 9, 2012

(30) Foreign Application Priority Data
Mar. 25, 2009 (DE) .......... 10 2009 014 317

(51) Int. Cl.
*F16H 57/02* (2012.01)
*F16H 57/04* (2010.01)
*F16H 61/00* (2006.01)

(52) U.S. Cl.
CPC ....... *F16H 57/0447* (2013.01); *Y10T 74/19991* (2015.01); *Y10T 74/2189* (2015.01); *F16H 57/0416* (2013.01); *F16H 57/0423* (2013.01); *F16H 57/045* (2013.01); *F16H 57/0471* (2013.01); *F16H 57/0493* (2013.01); *F16H 57/0495* (2013.01)

(58) Field of Classification Search
USPC ............... 74/467, 606 A, 606 R; 165/41, 96; 184/11.1, 11.2, 13.1, 6.12; 384/462, 384/464, 467, 473, 474, 476; 475/161
See application file for complete search history.

(56) References Cited

U.S. PATENT DOCUMENTS

| 1,143,307 | A | | 6/1915 | Noyes |
| 1,220,810 | A | | 3/1917 | Alquist |
| 1,549,305 | A | * | 8/1925 | Hardwick ................. 184/11.1 |
| 1,902,934 | A | * | 3/1933 | Acker ..................... 74/606 R |
| 1,971,781 | A | | 8/1934 | Henderson et al. |

(Continued)

FOREIGN PATENT DOCUMENTS

| DE | 825 359 | 3/1952 |
| DE | 858 920 | 12/1952 |

(Continued)

OTHER PUBLICATIONS

International Preliminary Report on Patentability, issued in corresponding International Application No. PCT/EP2010/001536.

(Continued)

*Primary Examiner* — David M Fenstermacher
*Assistant Examiner* — Jake Cook
(74) *Attorney, Agent, or Firm* — Kenyon & Kenyon LLP

(57) ABSTRACT

A gear unit, including an input shaft,
a bearing for supporting the input shaft being provided in a housing part of the gear unit,
wherein
a fan impeller is provided on the input shaft,
the housing part being beveled at least in the surface area adjacent to the fan impeller and/or a beveled cowl being mounted on the housing part.

49 Claims, 18 Drawing Sheets

(56) References Cited

U.S. PATENT DOCUMENTS

| | | | | |
|---|---|---|---|---|
| 2,147,391 A * | 2/1939 | Acker | | 74/606 A |
| 2,186,269 A * | 1/1940 | Pelphrey | | 184/6.12 |
| 2,489,699 A * | 11/1949 | Clark | | 184/11.1 |
| 2,532,779 A * | 12/1950 | Parks | | 384/428 |
| 2,536,385 A | 1/1951 | Miller | | |
| 2,602,522 A * | 7/1952 | Roos | | 184/11.1 |
| 2,860,726 A * | 11/1958 | Thomas et al. | | 184/11.1 |
| 2,950,943 A * | 8/1960 | Forrest | | 384/465 |
| 3,029,661 A | 4/1962 | Schmitter | | |
| 3,254,925 A * | 6/1966 | Cox | | 384/132 |
| 3,529,698 A | 9/1970 | Nelson | | |
| 3,625,310 A * | 12/1971 | Herrick | | 184/6.12 |
| 3,806,214 A * | 4/1974 | Keiser | | 384/589 |
| 4,242,923 A * | 1/1981 | Nishikawa et al. | | 475/160 |
| 4,612,818 A * | 9/1986 | Hori et al. | | 74/467 |
| 4,630,711 A | 12/1986 | Levrai et al. | | |
| 4,633,938 A * | 1/1987 | Schunck et al. | | 165/47 |
| 4,872,502 A * | 10/1989 | Holzman | | 165/299 |
| 4,952,077 A | 8/1990 | Kurt | | |
| 5,522,476 A * | 6/1996 | Holman | | 184/6.12 |
| 5,597,370 A * | 1/1997 | Nogle | | 475/159 |
| 5,622,051 A | 4/1997 | Iida et al. | | |
| 5,718,651 A | 2/1998 | Merkle et al. | | |
| 5,725,072 A | 3/1998 | Yamamoto et al. | | |
| 5,768,954 A | 6/1998 | Grabherr et al. | | |
| 5,927,384 A * | 7/1999 | Waldner, Jr. | | 165/47 |
| 6,036,615 A * | 3/2000 | Young et al. | | 475/161 |
| 6,474,444 B1 | 11/2002 | Mochizuki | | |
| 6,644,439 B2 | 11/2003 | Schnitzer | | |
| 6,991,574 B2 * | 1/2006 | Martin, III | | 475/159 |
| 6,997,284 B1 | 2/2006 | Nahrwold | | |
| 7,445,574 B2 * | 11/2008 | Weith | | 475/160 |
| 2003/0083171 A1 | 5/2003 | Turner et al. | | |
| 2004/0188946 A1 * | 9/2004 | Weiler | | 277/411 |
| 2005/0103570 A1 | 5/2005 | Gibson et al. | | |
| 2006/0048600 A1 * | 3/2006 | Taguchi et al. | | 74/607 |
| 2006/0060424 A1 * | 3/2006 | Tominaga et al. | | 184/11.1 |
| 2006/0231337 A1 | 10/2006 | Vogeltanz | | |
| 2006/0278475 A1 * | 12/2006 | Takahashi et al. | | 184/6.12 |

FOREIGN PATENT DOCUMENTS

| | | | |
|---|---|---|---|
| DE | 1 720 409 | 4/1956 | |
| DE | 1 034 430 | 7/1958 | |
| DE | 1 946 942 | 9/1966 | |
| DE | 1 984 404 | 4/1968 | |
| DE | 1 989 640 | 7/1968 | |
| DE | 12 91 966 | 4/1969 | |
| DE | 36 06 963 | 9/1986 | |
| DE | 41 32 780 | 4/1992 | |
| DE | 44 14 164 | 10/1995 | |
| DE | 195 29 586 | 8/1996 | |
| DE | 196 52 834 | 10/1997 | |
| DE | 197 11 743 | 9/1998 | |
| DE | 198 56 941 | 2/2000 | |
| DE | 100 36 975 | 4/2001 | |
| DE | 100 51 356 | 4/2002 | |
| DE | 10 2004 022 863 | 12/2005 | |
| DE | 10 2005 005 154 | 8/2006 | |
| DE | 10 2005 031 197 | 1/2007 | |
| EP | 0 353 445 | 2/1990 | |
| EP | 853 225 | 7/1998 | |
| GB | 409 883 | 5/1934 | |
| GB | 493 698 | 10/1938 | |
| GB | 757 480 | 9/1956 | |
| GB | 1 426 352 | 2/1976 | |
| GB | 2 166 816 | 5/1986 | |
| GB | 2 271 161 | 4/1994 | |
| JP | 05215203 A * | 8/1993 | F16H 57/02 |
| JP | 7-217725 | 8/1995 | |
| JP | 11-051159 | 2/1999 | |
| WO | WO 2007/124885 | 11/2007 | |

OTHER PUBLICATIONS

International Search Report, issued in corresponding International Application No. PCT/EP2010/001536.
European Office Action, dated Jul. 19, 2012, issued in corresponding European Patent Application No. 10710203.0.
International Preliminary Report on Patentability, issued in corresponding International Application No. PCT/EP2010/001535.
International Search Report, issued in corresponding International Application No. PCT/EP2010/001535.
International Preliminary Report on Patentability, issued in corresponding International Application No. PCT/EP2010/001537.
International Search Report, issued in corresponding International Application No. PCT/EP2010/001537.
International Preliminary Report on Patentability, issued in corresponding International Application No. PCT/EP2010/001538.
International Search Report, issued in corresponding International Application No. PCT/EP2010/001538.
European Office Action, dated Jan. 24, 2013, issued in corresponding European Patent Application No. 10710202.2.
European Office Action, dated Jul. 20, 2012, issued in corresponding European Patent Application No. 10710202.2.
European Office Action, dated Jul. 19, 2012, issued in corresponding European Patent Application No. 10708729.8.
European Office Action, dated Jul. 18, 2012, issued in corresponding European Patent Application No. 10708730.6.

* cited by examiner

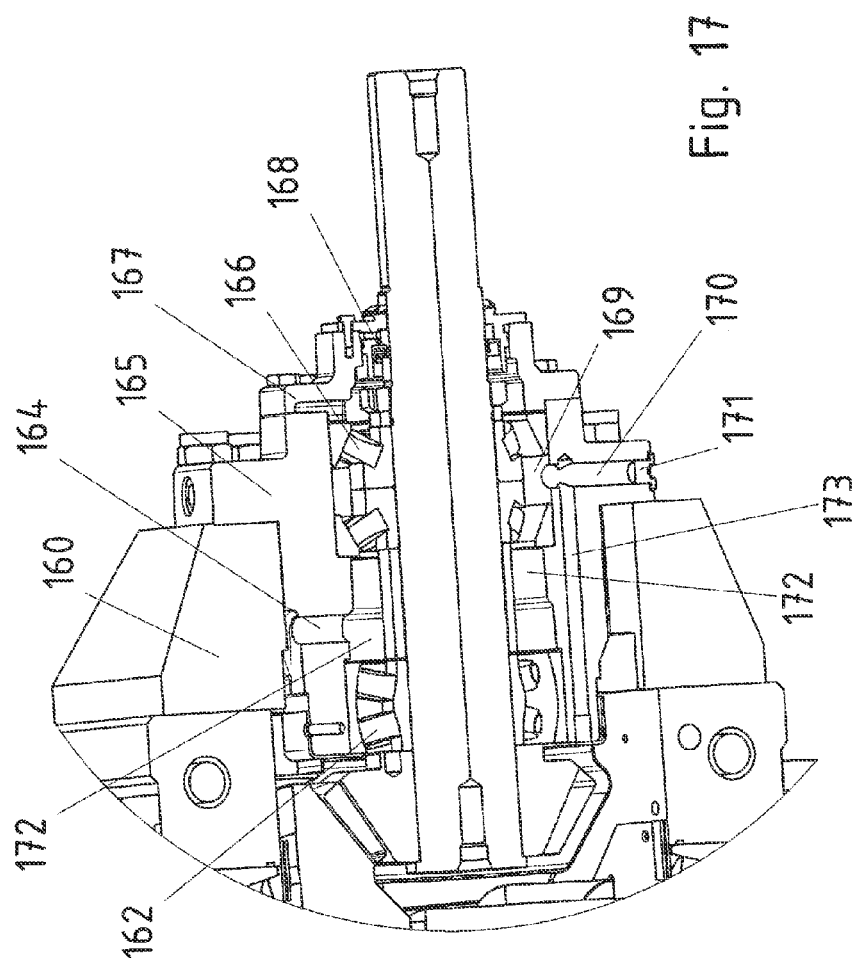

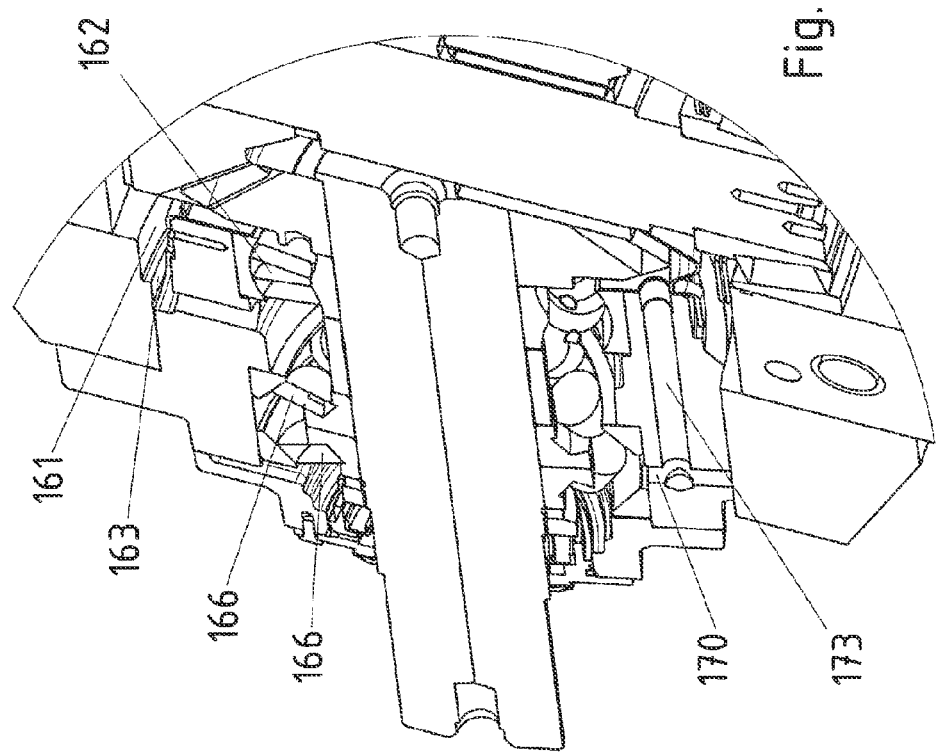

GEAR UNIT

FIELD OF THE INVENTION

The present invention relates to a gear unit.

BACKGROUND INFORMATION

It is well-known that gear units having oil lubrication are practicable, the oil, i.e., liquid, collecting in the bottom part of the gear-unit interior when the gear unit is not in operation, thus when the gear wheels are stationary, and forming the oil pan there which has an oil level that corresponds to the filling level upon pouring in the oil.

During operation of the gear unit, especially at nominal speed of the input shaft and/or output shaft, the gearing parts of the gear unit spray and hurl oil around. In particular, oil is also sprayed out from the gearings engaging with each other.

SUMMARY

Example embodiments of the present invention provide a gear unit in which the intention is for as much power as possible to be transmittable per unit volume.

Among features of example embodiments of the present invention with respect to the gear unit are that it has an input shaft,
a bearing for supporting the input shaft being provided in a housing part of the gear unit,
a fan impeller being provided on the input shaft,
the housing part being beveled at least in the surface area adjacent to the fan impeller and/or a beveled cowl being mounted on the housing part.

This offers the advantage that the cooling airflow is able to be guided as well as possible, and therefore the greatest possible portion of the airflow streams along the housing. In this manner, a powerful cooling airflow for cooling the gear unit is able to be generated by the passively driven fan impeller, thus, driven without separate motor actuator, and great power is able to be generated per unit volume.

In example embodiments, cooling fins are provided on the beveled area of the housing part or on the cowl. This has the advantage that the surface is enlarged, thus ensuring improved heat dissipation. In particular, the heat is able to be conducted by air from the housing to the cowl, and from there to the surroundings. Moreover, the beveled housing part or the beveled cowl acts as an air-guide element and reduces the turbulence.

In example embodiments, cooling fins and/or cooling fingers are provided on the housing part of the gear unit. This is advantageous because the surface is enlarged. In the case of the cooling fingers, an isotropic heat dissipation is even achievable, thus, heat dissipation independent of the installed orientation of the gear unit.

In example embodiments, a housing cover, imperviously connectable to a housing part and having cooling fins on its outer side, is provided on the housing of the gear unit. The advantage here is that a large opening is provided in the housing of the gear unit for assembly, maintenance or for oil change.

In example embodiments, the cooling fins are aligned corresponding to the direction of the cooling airflow, in particular, the cooling fins being aligned in parallel relative to each other. This is advantageous in that the airflow is able to be developed in a suitable manner, in particular, an air-guide function is feasible.

In example embodiments, the input gear stage is a right-angle gear stage. This offers the advantage that a beveled housing is able to be provided, and therefore an improved air-guide function is achievable.

In example embodiments, an air-guide containment is provided around the gear unit. This is advantageous because the cooling airflow is able to be passed through between the gear housing and the containment, and thus very good utilization of the cooling airflow is attainable in an easy manner. In addition, further protection is attained for the gear housing, especially for bearing covers, screw plugs and/or oil drain plugs and the like. Such parts are therefore also practicable in plastic instead of steel or cast steel, since the containment may be realized from sheet steel, and thus a metallic protection is provided against the surroundings.

In example embodiments, the air-guide containment guides the cooling airflow and, together with the cooling fins and the housing of the gear unit, restricts it to the spatial area provided for the cooling airflow, so that in particular, the cooling airflow absorbs as much of the heat output of the gear unit as possible. Of advantage here is that the airflow is able to be guided in such a way that the best possible cooling of the housing is attainable with the aid of the airflow.

In example embodiments, the air-guide containment has passages for the input and output shafts, as well as for the floor mounting of the gear unit, in particular, the air-guide containment moreover having an opening for a sensor. This is advantageous in that the openings are easily realizable, thus, do not have to be sealed off.

In example embodiments, a pipe is provided for conducting oil out of the gear-unit interior into the area of the cooling airflow, and a pipe for returning the oil to the gear-unit interior is likewise provided in the area of the cooling airflow, in particular, the pipes being disposed completely or at least partially in the cooling airflow generated by the fan impeller. The advantage in this case is that the oil of the gear unit may be cooled in an easy manner. In particular, the oil only has to be conducted out and in again in a pipe.

In example embodiments, the oil conveyed by the pipe for conducting oil out is fed to a plate cooler situated on the housing of the gear unit, especially in the cooling airflow, in particular, the pipe for returning the oil conveying oil from the plate cooler back into the interior of the gear unit. The advantage in this case is that improved heat dissipation is achievable; in particular, the plate cooler is able to be disposed in the cooling airflow and therefore is able to be cooled passively. The oil flow is in contact with the plate cooler for a very long time via a meander-shaped guideway formed in the plate cooler, and is therefore able to emit the greatest possible heat flow to the air.

In example embodiments, the oil level, especially of the oil pan of the gear unit, is lower during operation than the oil level during long-term standstill of the gear unit, in particular, a device being provided for lowering the operational oil level, the device for lowering especially being a device for the temporary storage of oil. The advantage in this context is that when starting the gear unit, the bearings and gearing parts are soaked well by oil, since the oil level is very high at the beginning. In operation, thus, when the oil level is lower, the churning losses are reduced, and the bearings or gearing parts are able to be lubricated from the temporary storage via other delivery devices. In operation, these delivery devices are operable without representing an additional energy loss of the gear unit.

In example embodiments, a temporary storage is provided to which oil is able to be delivered from the oil pan of the gear unit, especially with the aid of a delivery device; in particular, the temporary storage is disposed in the interior of the gear unit, thus, is surrounded by the gear housing in housing-forming fashion. This is advantageous because no additional housing or an additional spatial area is necessary for the temporary storage; rather, the spatial area present in the housing of the gear unit is usable. This holds true especially for a housing which surrounds the gearing parts in substantially cuboidal fashion, a beveled area placed on the cuboid being able to be provided in the area of the input shaft. Advantageously, a cube housing is able to be produced easily and inexpensively, and exhibits great strength accompanied by small wall thickness and small amount of material used. Therefore, a substantially cuboidal interior space is available, minus the rotating area of the gearing parts, as well as the area of the shafts and bearings. This residual spatial area remaining is usable as temporary storage.

In example embodiments, the temporary storage is in the form of a receptacle which has openings of the kind that it is able to be emptied through these openings. The advantage in this case is that the temporary storage empties when the gear unit is in the state of rest, particularly with a first time constant. The temporary storage is filled with the aid of the delivery device in the gear unit with such a delivery rate that the delivered oil flow would fill the temporary storage with a second time constant assuming the openings were not present; this second time constant being smaller than the first time constant, especially more than three times smaller or even more than ten times smaller.

In example embodiments, the temporary storage is in the form of a receptacle that has openings such that, and the delivery device is implemented such that the maximum oil flow delivered by the delivery device, especially during operation of the gear unit with the nominal speed of the gear unit, is greater than the oil flow returned from the temporary storage to the oil pan, effected through the openings. This offers the advantage that the temporary storage is able to be filled quickly, and thus the oil level of the gear unit is lowered very rapidly after start-up. In particular, it is advantageous to provide the openings to be so small, and to implement the delivery device with a delivery rate, such that the oil flow delivered is at least three times or even ten times greater than the oil flow returned.

In example embodiments, the temporary storage has an overflow, especially a height-adjustable overflow, via which excess oil is able to be drained into the oil pan. This is advantageous in that, depending on the variant of the gear unit, adaptation of the oil level is feasible. In addition, adaptation of the lowered oil level as a function of the operating conditions and manufacturing tolerances is made possible.

In example embodiments, the delivery device has a baffle plate for catching oil, oil dripping off from the baffle plate being able to be fed via a drainage channel and/or collection channel to the temporary storage. This has the advantage that a part of the delivery means is realizable in an easy manner, and oil which is spraying around may easily be captured.

In example embodiments, the drainage channel or collection channel has an opening into which a pipe opens through, from which a ball bearing and/or a gearing may be lubricated. The advantage in this case is that the delivery devices are inexpensive and uncomplicated.

In example embodiments, the drainage channel is curved, so that a first portion of the oil dripped off from the baffle plate and caught by the drainage channel flows into a first collection channel, and a second portion of the oil dripped off from the baffle plate and caught by the drainage channel flows into a second collection channel, the temporary storage being fillable from the collection channels, and the collection channels being disposed axially to the side of a gear wheel of the gear unit. The advantage here is that the remaining spatial area, which does not count as part of the rotational area of the gearing parts and is provided in the interior of the cuboidal gear unit, is usable.

In example embodiments, at least one partial area of a gearing part of the gear unit is surrounded by a shell, so that oil is only allowed to spray upward; in particular, the shell has an opening at its lower side, thus permitting the shell to be filled from the oil pan, especially when the gear unit is not in operation. The advantage in this context is that more oil is sprayed upward, and thus improved heat dissipation is achievable, since the oil must cover a long distance to the oil pan, the oil being in contact with the housing of the gear unit during the flow back.

In example embodiments, the delivery device includes an oil scraper that permits oil to be scraped off from the end face of a rotating gear wheel, and allows the scraped-off oil to be delivered through a pipe to the temporary storage or to a collection channel, the pipe especially being directed upwards, the gear wheel in particular being disposed so that it is at least partially submerged in the oil pan, and the oil scraper in particular being situated above the oil pan. This is advantageous in that a further inexpensive and uncomplicated delivery device is able to be provided. In particular, a conveying effect is attainable in order to convey oil through the pipe into a collection device or a temporary storage, from which, in turn, a pipe leading into the surroundings is able to be fed. Therefore, oil is thus able to be conveyed into the surroundings and cooled there in the cooling airflow streaming past, especially with the aid of the plate cooler situated there.

In example embodiments, the pipe includes bores in the gear housing. This is advantageous because oil is able to be conveyed through these bores toward the bearings, e.g., ball bearings. Lubrication of these bearings may therefore be ensured.

In example embodiments, a delivery device conveys oil from the interior of the gear unit through a pipe which is attached to the outside of the gear unit, in particular, the pipe returning the oil to the interior of the gear unit. The advantage in this case is that after being brought out, the oil is able to be cooled in the outer area around the gear unit, especially in a cooling airflow which is propelled by a fan impeller.

In example embodiments, the pipe on the outside of the gear unit has a gradient, in particular, the oil from a collection device such as a temporary storage or collection channel disposed in the interior of the gear unit flowing outward through the pipe, and from there back again into the oil pan, in particular, the collection device being situated above the oil pan. This offers the advantage that the oil flow is able to be impelled merely by the gradient in the gravitational field, thus, passively. In this context, an energy loss of the gear unit is utilized for raising the oil, for during operation of the gear unit, the oil in its interior is sprayed around, especially upward, as well. A portion of the oil caught there is then conveyed downwards without a further pump, utilizing the gradient, and at the same time, is cooled.

In example embodiments, the pipe provided on the outside feeds oil to a plate cooler, and another part of the pipe returns oil from the plate cooler to the oil pan in the interior of the gear unit. The advantage in this instance is that oil is conveyed inexpensively using simple arrangements.

In example embodiments, the plate cooler is fastened to the outside of the gear unit and is situated in the cooling airflow. In this case, it is advantageous that an enlarged surface is provided and improved heat dissipation is therefore attainable. In particular, the plate cooler is alignable parallel to the cooling airflow, so that the flow exhibits the least possible turbulence.

In example embodiments, the spatial area of a shaft bearing disposed in an opening of the gear housing is bounded at least partially with respect to the interior of the gear unit by a delimiting means that has an opening for a shaft supported in the bearing, the lowest point of the opening resulting in a minimum oil level in the spatial area of the bearing. The advantage is thus that in operation, a minimum oil level is ensured in the area of the bearings, and therefore they are well-lubricated. An oil level higher than this minimum oil level is allowed when the gear unit is in the state of rest, and is lowered during operation of the gear unit. The initial lubrication of the bearing is therefore very good, and nevertheless, losses during operation are able to be reduced.

In example embodiments, the spatial area is bounded at least partially by the gear housing. This is advantageous because the spatial area is the area of the bearing, which is to be delimited with respect to the gear interior only with the aid of the protection plate.

In example embodiments, the delimiting device is a protection plate or a ring. The advantage here is that an inexpensive and uncomplicated delimitation of the spatial area is attainable.

In example embodiments, the protection plate is welded or screw-connected to the housing. This is advantageous because a tight connection is able to be produced in an inexpensive and uncomplicated manner.

In example embodiments, the ring is provided in a groove, especially a groove going round in the circumferential direction in the housing of the gear unit. This offers the advantage that the minimum oil level is specifiable in an easy manner. It may be that when using such a ring, the protection against spraying oil is not so high as when using a protection plate, but the minimum oil level is reliably adjustable in an easy manner.

In example embodiments, the opening encircles the through-going shaft as closely as possible, especially with a clearance of less than 3 mm, particularly of less than 1 mm. This is advantageous because the best possible protection against oil spraying on or oil foam is achievable.

In example embodiments, the protection plate is flat, in particular, covers the area of the opening for the bearing.

This is advantageous because a simple sheet-metal stamping is usable, in which only the external contour and the openings for the passage of shafts, especially semicircular openings which are provided at the edge area of the protection plate, are necessary.

In example embodiments, the housing of the gear unit includes a lower and an upper housing part, the assembly of the gear unit being achievable very easily and inexpensively, a protection plate which essentially surrounds the lower half of the shaft being attached to the lower housing part,
a further protection plate which substantially surrounds the upper half of the shaft being attached to the upper housing part. The advantage in this case is that a ring or a protection plate is able to be inserted especially easily. In the same manner, components such as bearings, shafts and gear wheels may be installed without difficulty, for they are easily inserted from above into the corresponding accommodation area. In the case of a ring, the accommodation area is a groove running in the direction of rotation. The protection plate, on the other hand, is insertable from above and is then able to be pressed onto the housing wall. After that, a welded connection and/or screw connection is possible.

In example embodiments, the bearings, especially the two bearings of the input shaft of the gear unit, are provided in a housing part, particularly in a substantially cup-shaped housing part, the housing part being screw-connected to a housing part of the gear unit. This offers the advantage that the fitting of the input shaft into a housing part is able to be prefabricated, thus, may be preassembled. Therefore, this unit, including the input shaft, its bearings and associated seal, are able to be stocked in the warehouse and may be installed easily and quickly. In particular, a series of gear units is also able to be produced, which offers great variance using few parts. Namely, the gear unit is realizable as a parallel shaft gear unit if the opening provided in the gear housing for the cup-shaped housing part is occluded and the input shaft is provided at an opening in the side wall of the gear unit. Alternatively, however, the right-angle gear stage may also be provided instead of the occluding part. Thus, a gear unit with input right-angle gear stage or input parallel-shaft gear stage may be produced from the same basic housing.

In example embodiments, a first bearing is implemented as a bearing pair, a first interspace being formed in the axial direction between the paired individual bearings. This has the advantage that high transverse forces are able to be absorbed, and therefore a particularly stable gear unit is able to be produced. In particular, it is possible to use a pair of individual bearings, preloaded relative to each other, between whose outer rings an interspace is therefore produced.

In example embodiments, a second bearing in the axial direction is set apart axially from the first bearing, so that a second interspace is formed. This is advantageous because, again, high transverse forces are able to be absorbed. The greater the distance between the bearings, the higher the absorbable transverse forces.

In example embodiments, a first bearing of the input shaft takes the form of a pair of tapered-roller bearings, especially in an X-configuration, preloaded relative to each other, and a second bearing is in the form of a self-aligning roller bearing. This offers the advantage that an especially stable arrangement, able to absorb transverse forces, may be produced.

In example embodiments, the first and/or second interspace is/are connected by one or more bores to the interior of the gear unit, particularly for the purpose of emptying. The advantage in this instance is that good lubrication is attainable with the gear unit at rest. To that end, it is advantageous to plan the oil level of the gear unit to be suitably high in the state of rest, or the position and the gradient of the bores to be suitably low. For a gear unit in operation, a minimum oil level is again able to be maintained in the interspaces by suitable determination of the height of the bores and of the gradient. In particular, bores without gradient are advantageously usable, as well. A further advantage of the emptying of the interspaces is that no great quantities of oil are present long-term on the input-side seal, and therefore the danger of an oil leak is reducible.

In example embodiments, the first and/or second interspace is/are connected by a gap to the interior of the gear unit, especially for the purpose of emptying, the gap being formed between the housing part, particularly the substantially cup-shaped housing part, and the housing part of the gear unit. This is advantageous because a passage for oil may be provided in an easy manner, thus permitting the interspace to be emptied without additional expenditure.

In example embodiments, a bore or one of the bores is a radial bore. This is advantageous because a simple and inexpensive bore may be provided for the emptying process. In particular, it may be disposed in the direction of gravity, so that especially effective emptying is achievable. However, to maintain a minimum oil level, a horizontal alignment of the bore is also advantageous.

In example embodiments, a bore or one of the bores is an axially directed bore. This is advantageous because emptying to the oil pan situated axially further inside is achievable with little effort.

In example embodiments, the radial bore is plugged at its outer end by a stopper. The advantage in this case is that not only is a simple and inexpensive radial bore sufficient for the purpose of emptying, but an access is also created to the area of the bearings. Therefore, sensors, e.g., for determining rotational speed of the input shaft, transverse force or axial force, or perhaps sensors for monitoring the functioning of the bearings, such as temperature sensors or structure-borne noise sensors, may also be disposed in the area of the bearings. The associated signal lines are able to be brought out without special effort through the radial bore and the suitably tightly closing stopper.

In example embodiments, an input shaft is sealed off by a shaft sealing ring from the housing part, especially the cup-shaped housing part. This is advantageous, because an oil leak is preventable.

In example embodiments, the level of the placement of the bore or of the gap for emptying an interspace determines a minimum oil level for the bearings of the input shaft. This offers the advantage that a minimum oil level may be maintained in an easy and inexpensive manner.

LIST OF REFERENCE NUMERALS

1 Housing part
2 Fan impeller
3 Cooling fins
4 Housing cover with cooling fins
5 Cooling fins of housing cover 4
6 Cooling fins on the beveled housing part
7 Output shaft
8 Beveled housing area for right-angle gear stage
9 Cooling fins
41 Rotating flange part, joined in rotatably fixed fashion to output shaft 7
42 Air-guide containment
50 Discharge pipe
51 Feed pipe
52 Plate cooler
53 Discharge pipe
60 Feed pipe
61 Feed pipe
62 Discharge pipe
70 Oil level during operation
71 Oil level during standstill
72 Bearing
73 Shell for bevel wheel
74 Shell for bevel pinion
80 Temporary storage
90 Lateral collection pockets
91 Drainage hole for bearing lubrication
92 Baffle plate
93 Oil-conducting channel
100 Pipe
101 Scraper
120 Gear wheel
130 Roof-shaped housing cover
131 Protection plate
132 Overflow
151 Housing cover
160 Gear housing
161 Gap
162 Self-aligning roller bearing
163 Gap
164 Bore
165 Housing part, cup-shaped
166 Tapered roller bearings in X-configuration, preloaded relative to each other
167 Flange part
168 Shaft sealing ring
169 Interspace area between two tapered roller bearings
170 Bore, radial
171 Stopper
172 Interspace area
173 Bore, axial Example embodiments of the present invention are explained in detail with reference to the Figures.

Figure 8:
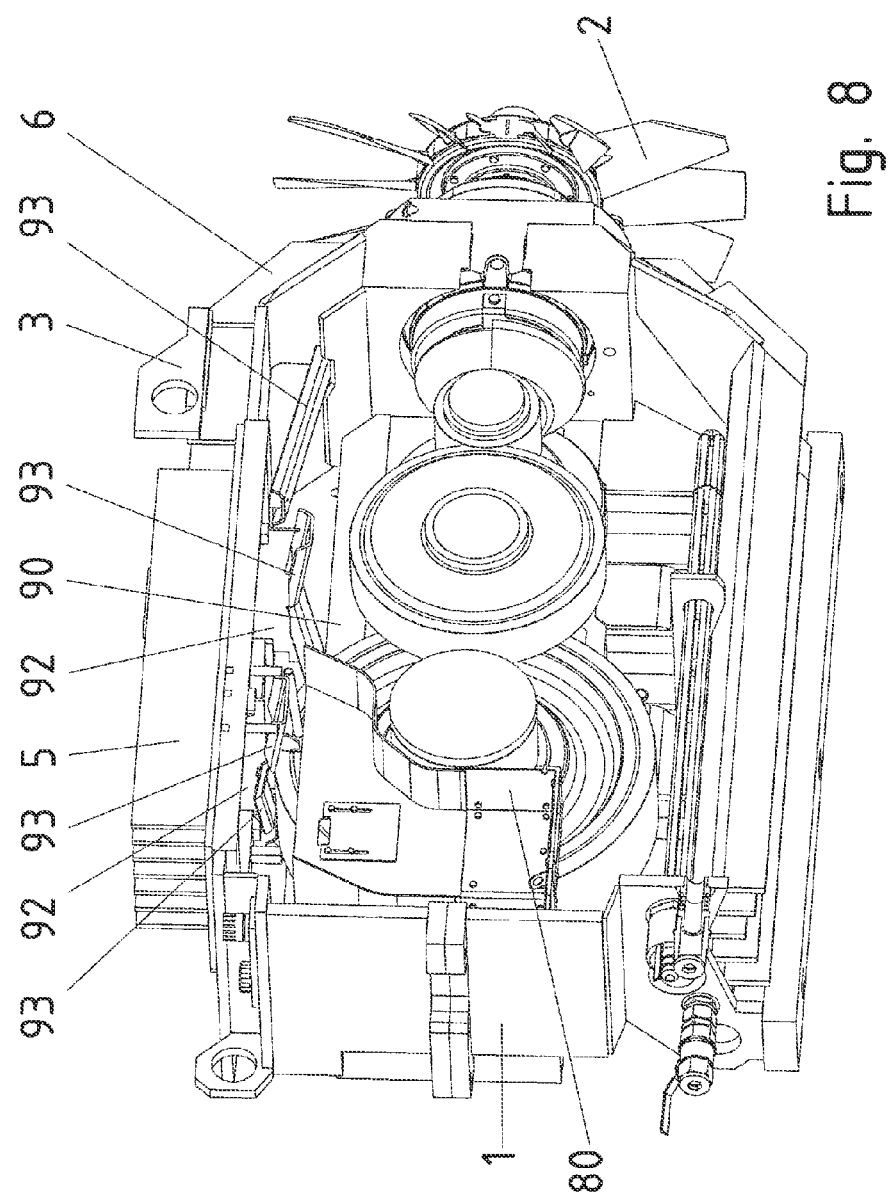

To that end, FIG. 8 also shows an oblique view in which conducting channels 93 and a collection pocket 90 can be seen, as well.

Figure 7:
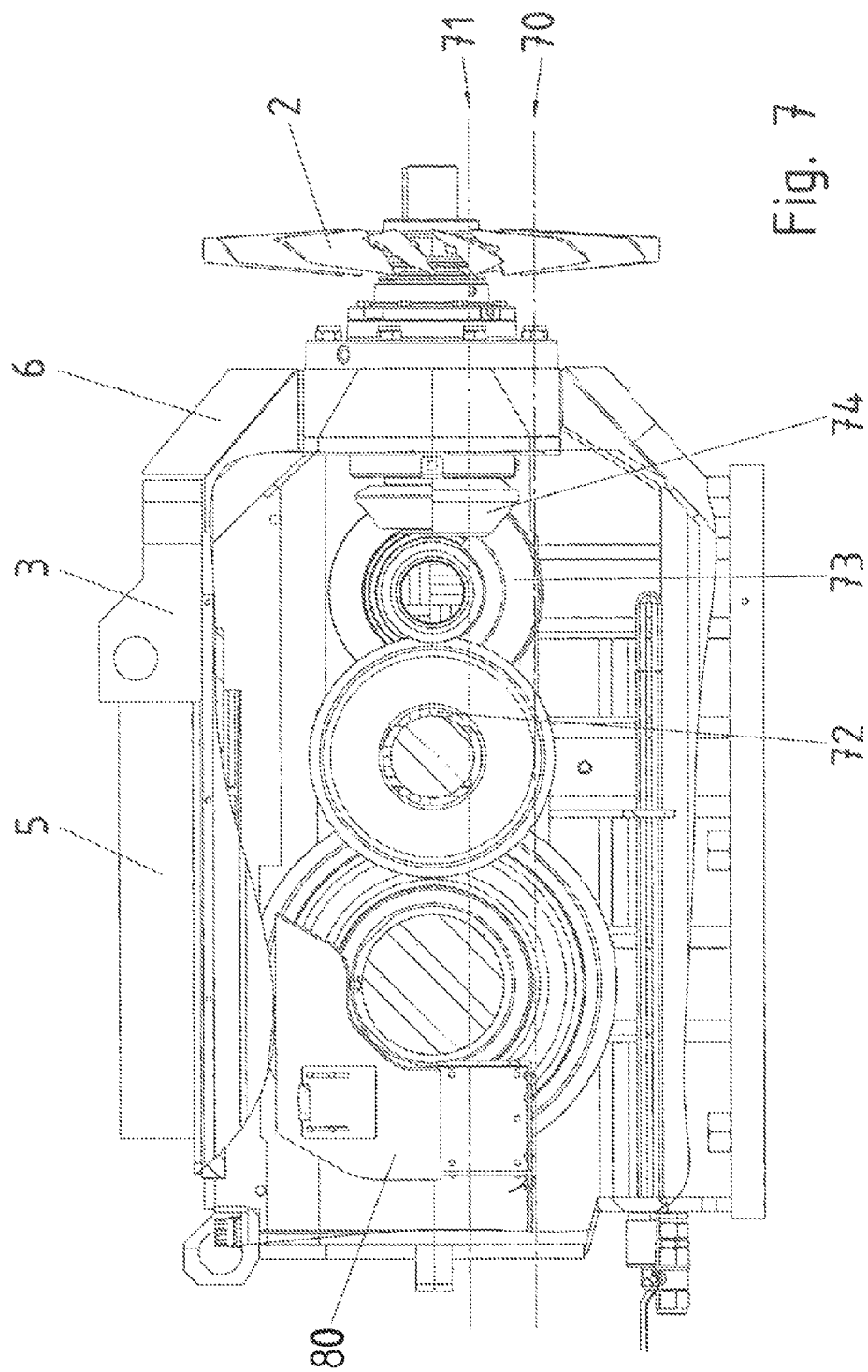
FIG. 7 shows another gear unit according to an example embodiment of the present invention in a lateral view, in which a lateral surface is cut into, the level of the oil during operation and during standstill being illustrated.
Figure 9:
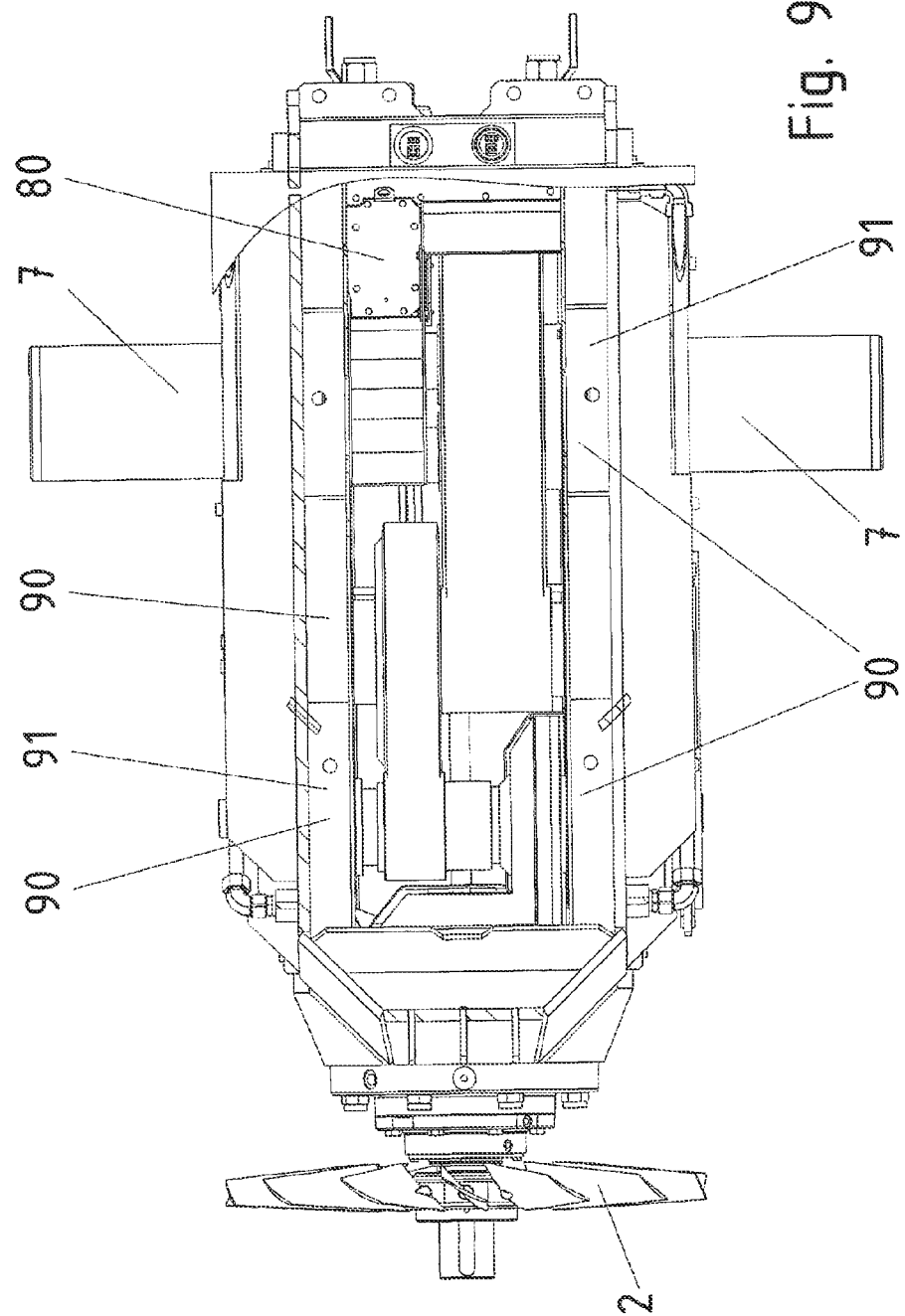

FIG. 9 shows the gear unit belonging to FIG. 7 in a top view, thus, with a direction of view from above, that likewise is shown cut into, the cut being into the upper side.

Figure 10:
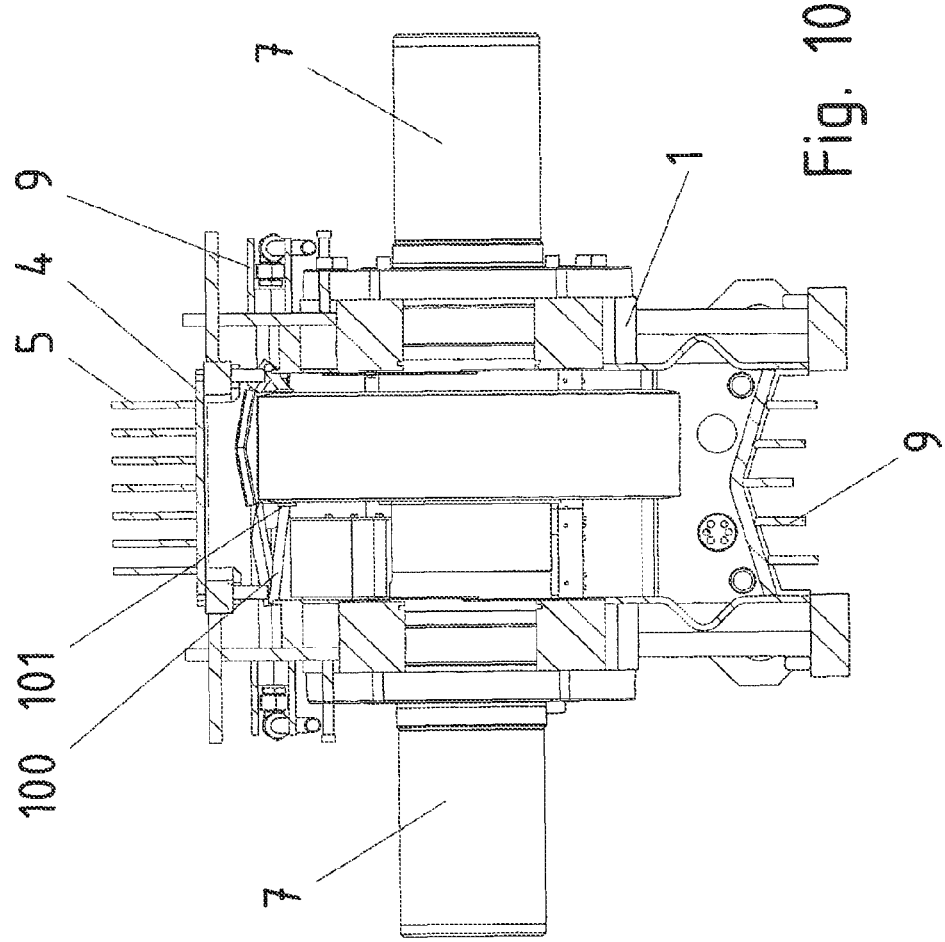

FIG. 10 shows a scraper element belonging to the oil-delivery device.

Figure 11:
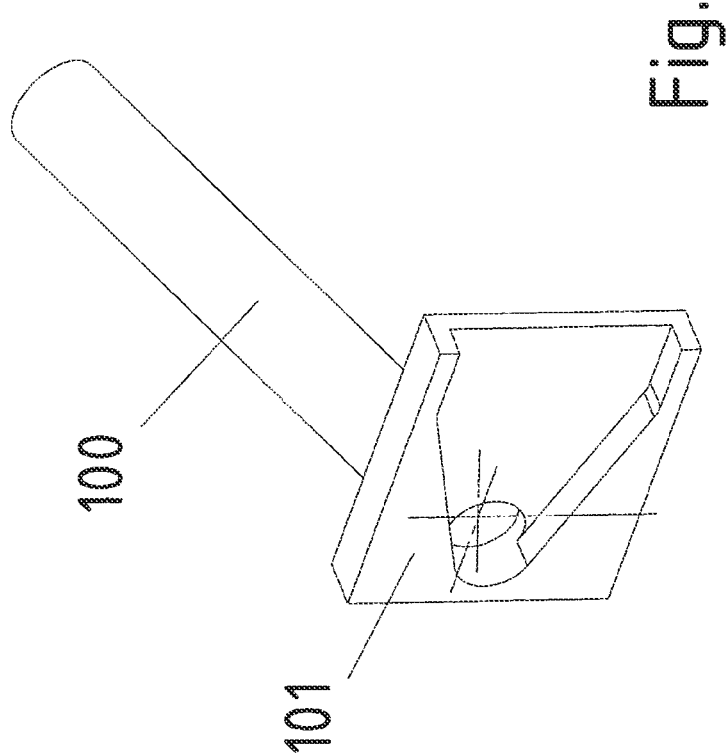

FIG. 11 shows the scraper element in an oblique view.

Figure 12:
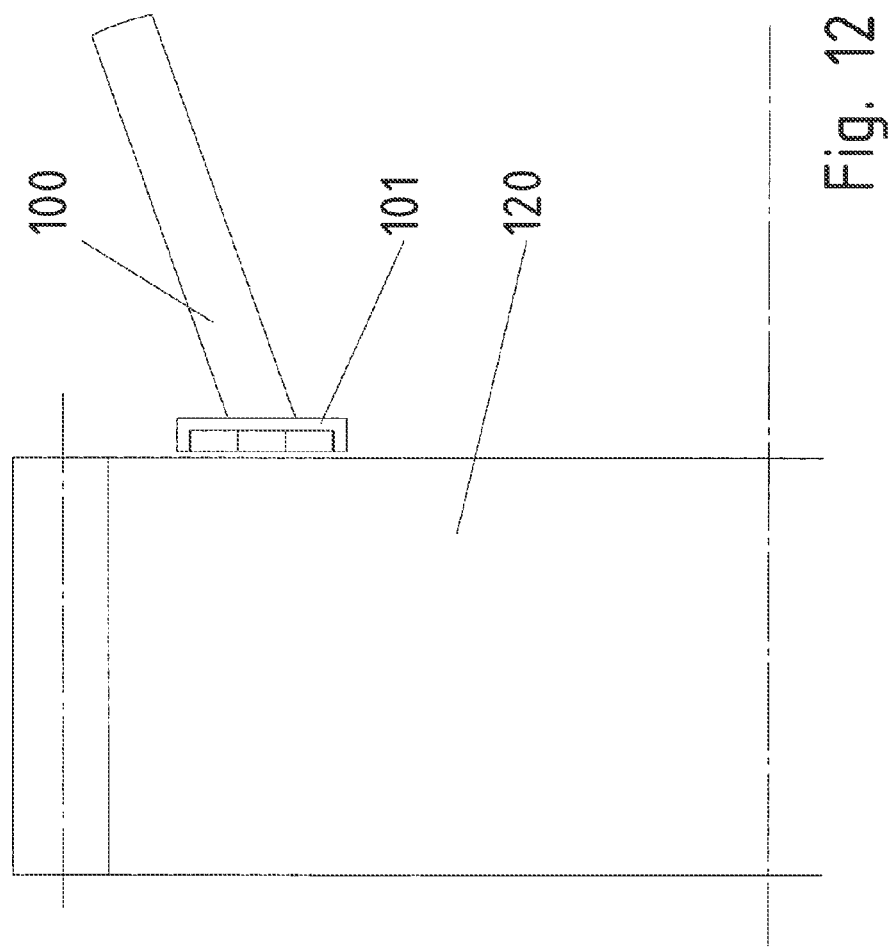

FIG. 12 shows the scraper element in a top view.

Figure 13:
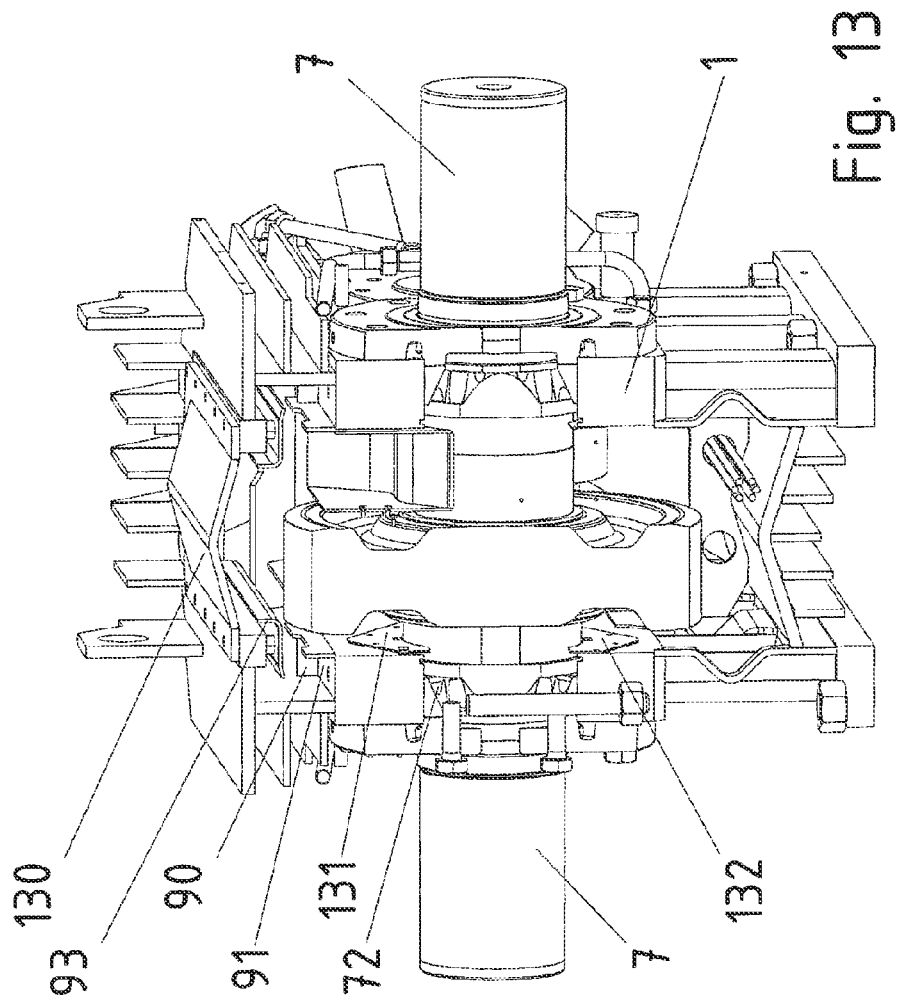

FIG. 13 shows protection plates 132 against spraying oil.

Figure 14:
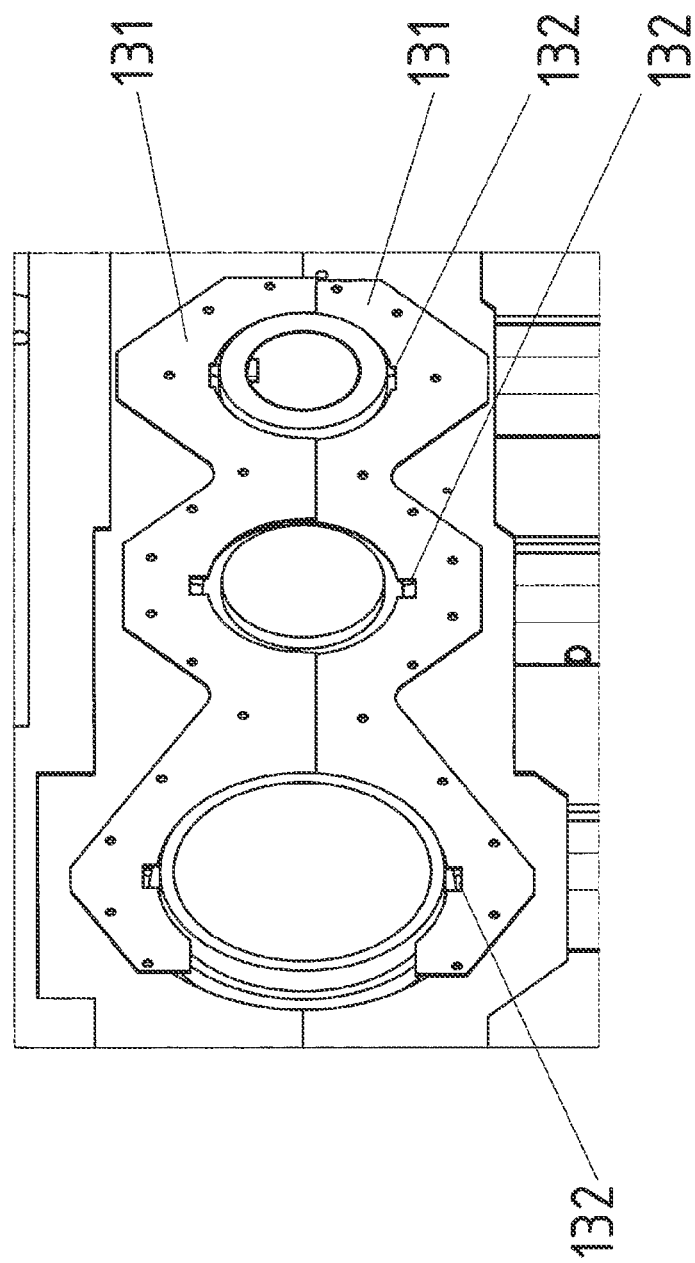

FIG. 14 shows protection plates 132 separately, the plates being joined to the gear housing.

Figure 15:
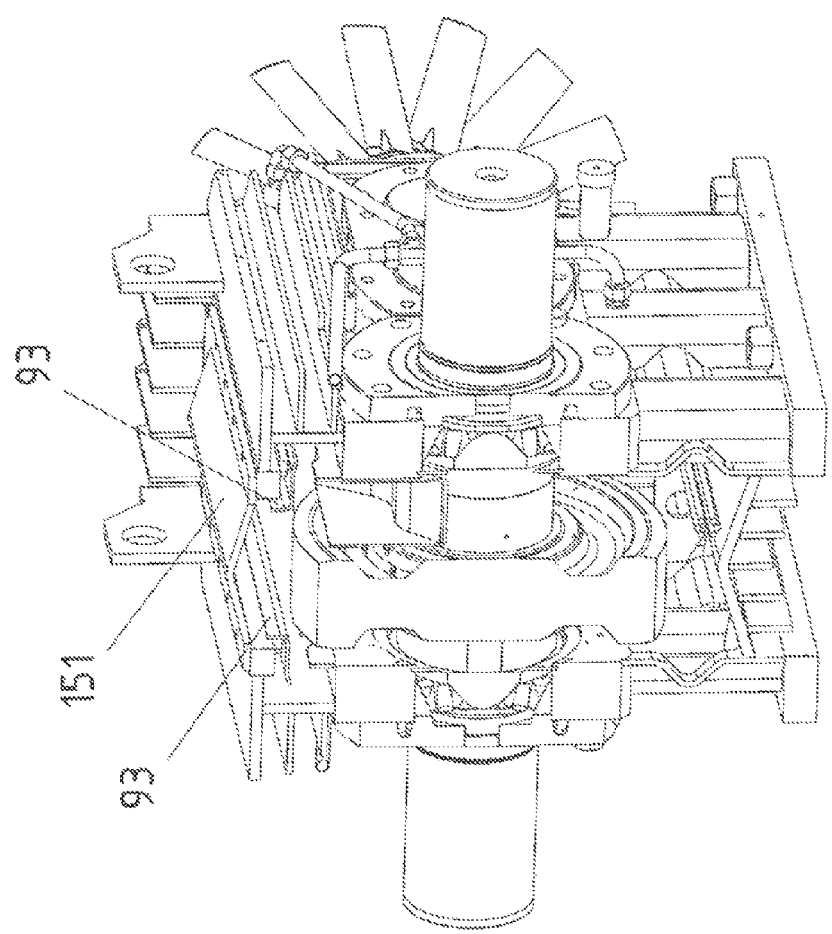

FIG. 15 shows a housing cover 151 which is roof-like.

Figure 16:
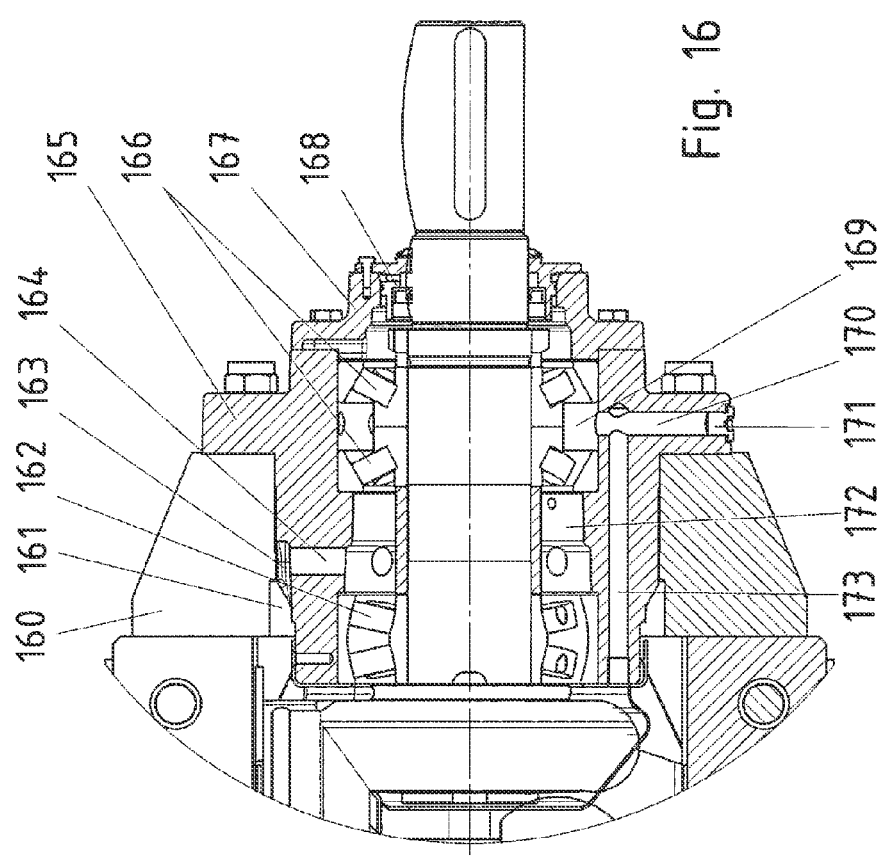

FIG. 16 shows a horizontal cross-section through the input right-angle gear stage.

FIG. 17 shows a top view into a similar section.

FIG. 18 shows the view from a different viewing direction.

DETAILED DESCRIPTION

Figure 1:
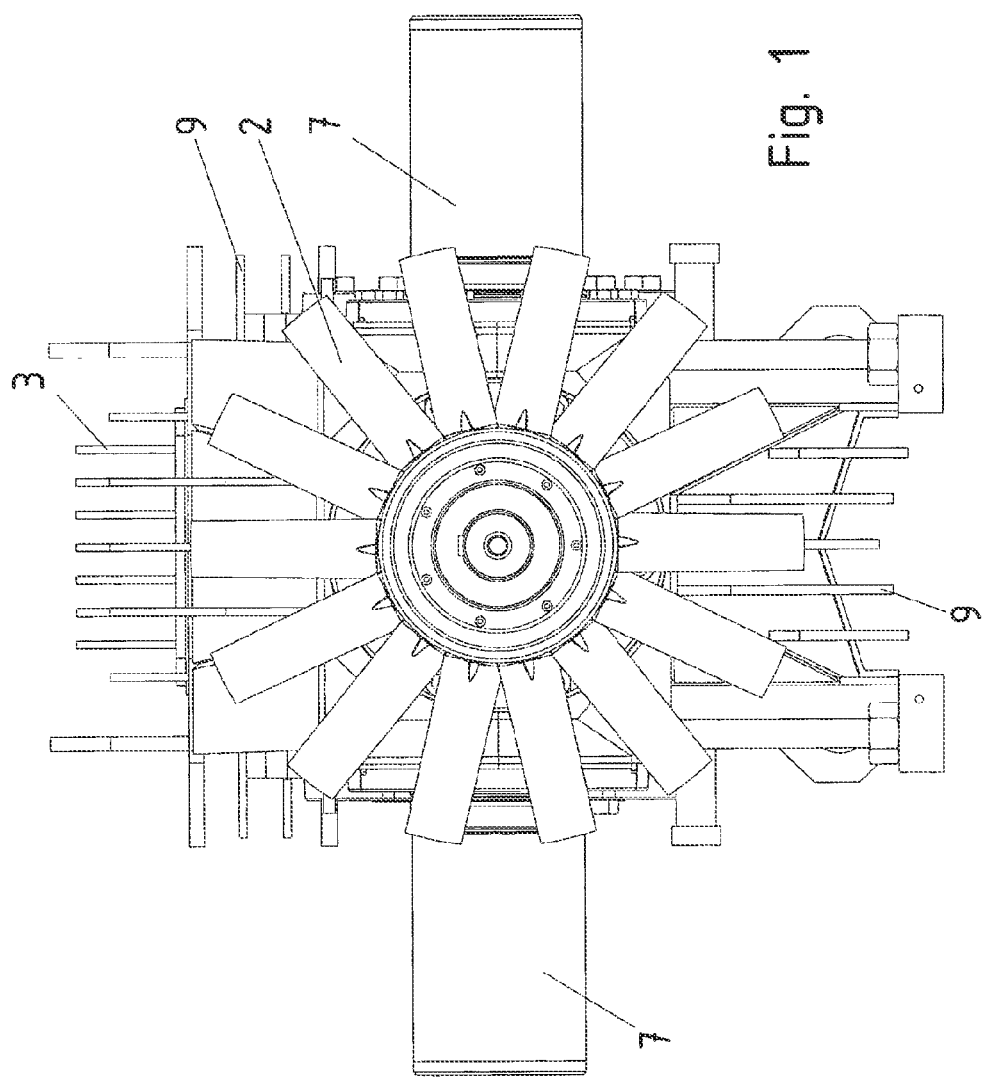
FIG. 1 shows a first gear unit according to an example embodiment of the present invention in a front view.
Figure 2:
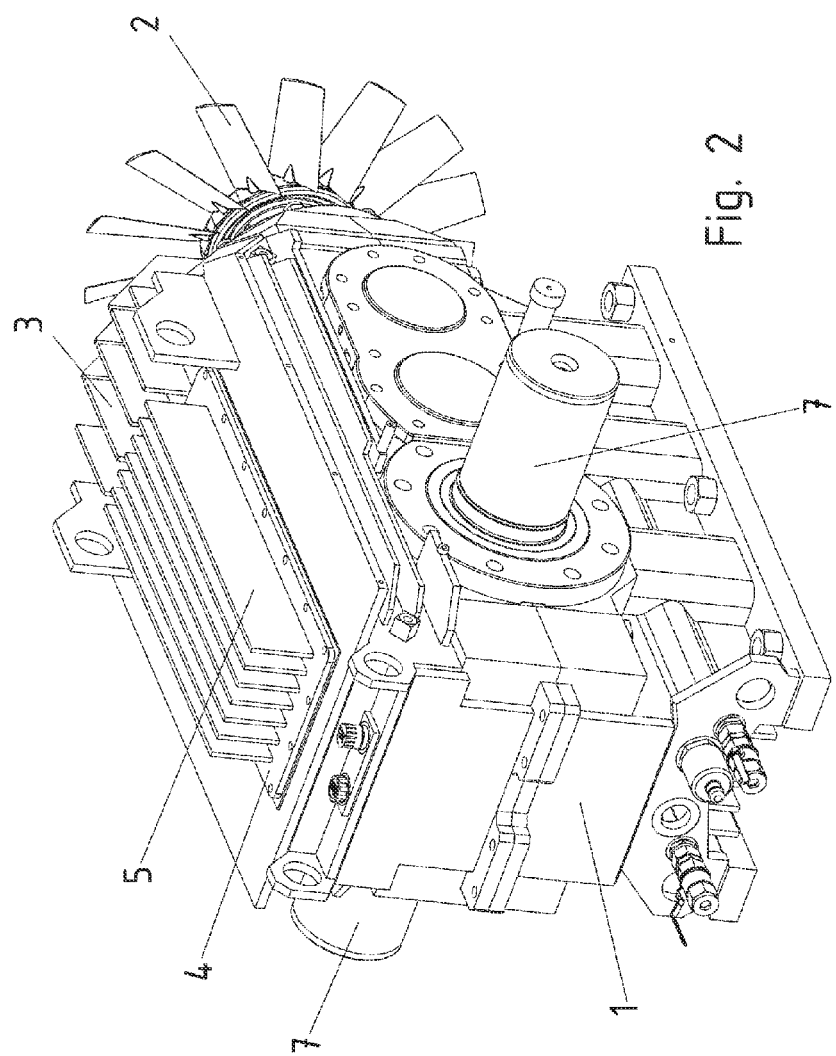
FIGS. 2 and 3 show the gear unit according to FIG. 1 from two different viewing directions.
Figure 3:
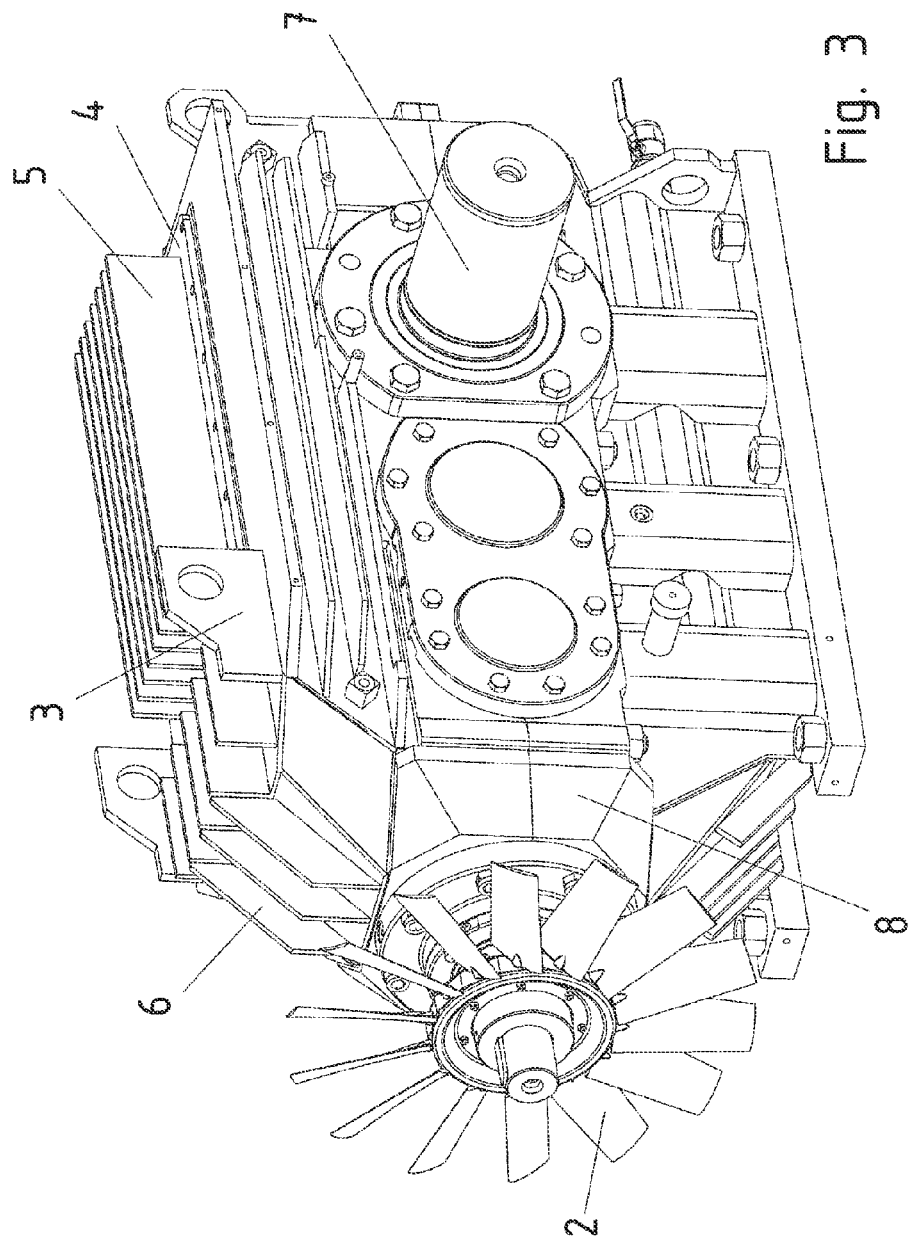

In the exemplary embodiment according to FIGS. 1 through 3, a fan impeller 2 is mounted in rotatably fixed manner on the input shaft. Thus, the fan impeller is operated with a suitably high rotational speed and generates a strong airflow with its fan-impeller blades when the gear unit is operated with the nominal speed. The higher the speed and the torque, the greater the power loss, thus, the heat output to be dissipated to the surroundings, as well.

The cooling airflow generated by fan impeller 2 is guided along a beveled housing area 8. It is produced either by mounting suitably formed sheet-metal pieces and joining them to housing part 1, or alternatively, by corresponding shaping of housing part 1, which is feasible without special additional effort particularly in the case of a right-angle gear stage to be provided as input.

In addition, cooling fins 6 are provided on beveled housing area 8, and cooling fins 3 and 9 are provided on housing part 1.

A housing cover 4 having cooling fins 5 is also provided on the housing part for assembly and maintenance purposes.

In this manner, it is possible to take optimal advantage of the cooling airflow.

Output shaft 7 is implemented on both sides, but in other exemplary embodiments, is also feasible on one side.

Figure 4:
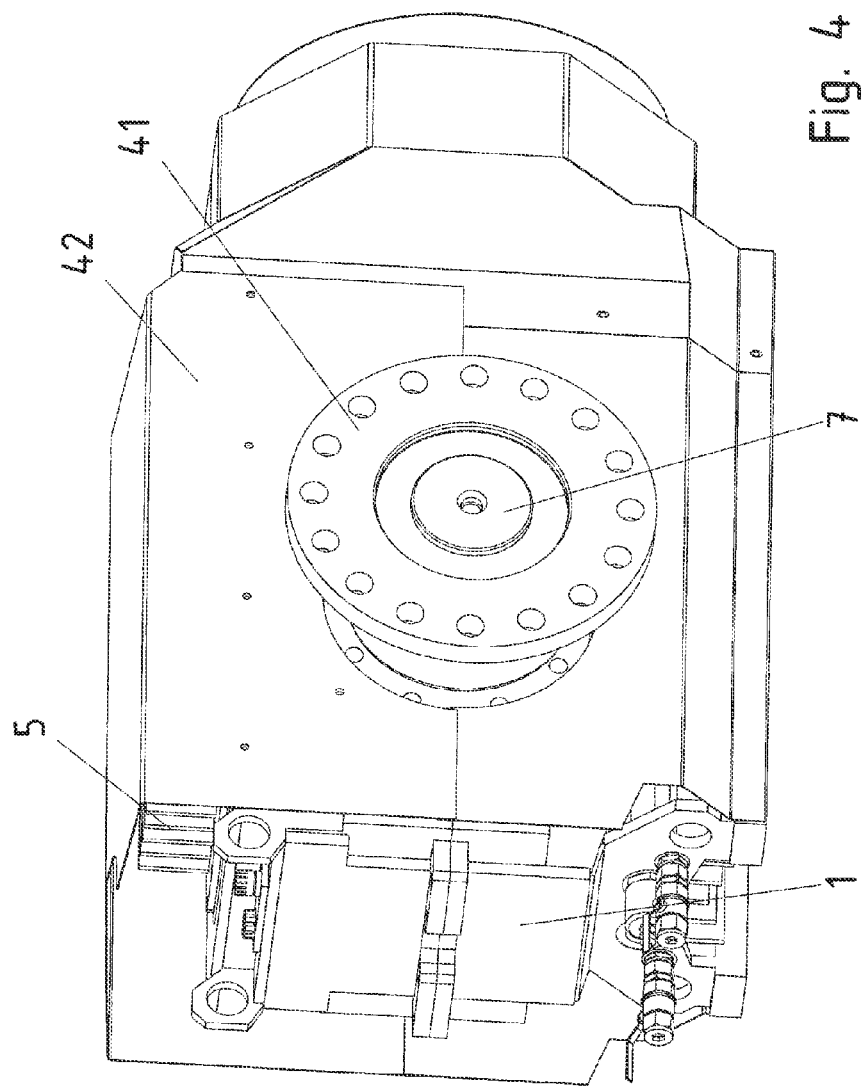
FIG. 4 shows a further gear unit of an example embodiment of the present invention in which, in contrast to FIGS. 1 through 3, a containment is additionally provided.

In FIG. 4, an air-guide part additionally provided on the gear unit, namely, an air-guide containment 42 is provided. In so doing, a passage for the input shaft and output shaft 7 is provided. In further contrast to FIGS. 1 through 3, output shaft 7 is joined in rotatably fixed manner to a rotating flange part 41.

Air-guide containment 42 reduces the drift of the cooling airflow, and therefore leads to more efficient heat dissipation. It also serves as protection against dust deposits on the gear housing, and therefore protects the heat-transfer resistance from the gear housing to the cooling airflow against deterioration.

In addition, further parts or components to be cooled may be disposed between the gear housing and the air-guide containment, such as power electronics or cooling devices for cooling oil. The following figures describe exemplary variants for the latter.

Figure 5:
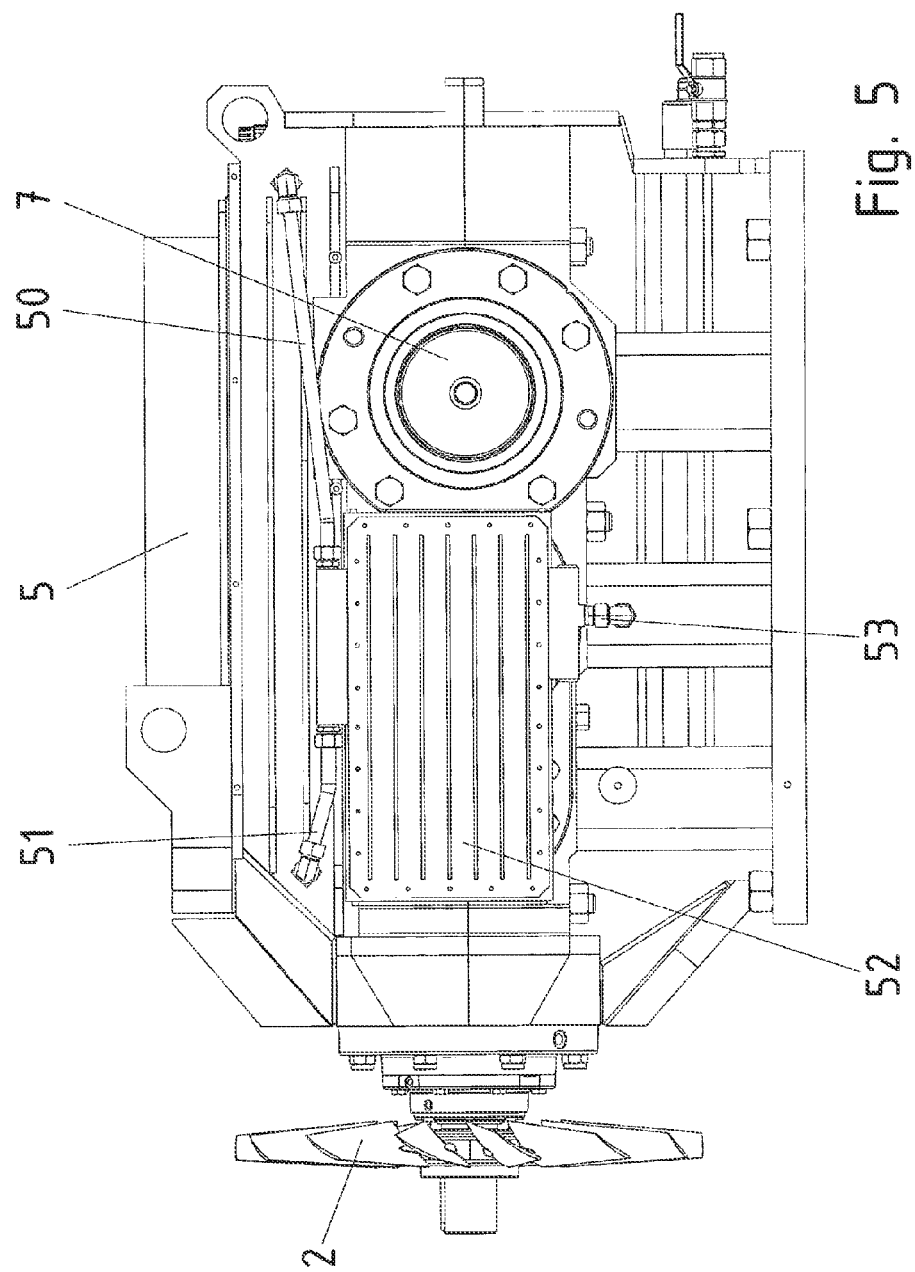
FIG. 5 shows a further gear unit of an example embodiment of the present invention having plate cooler 52, which is attached to the housing of the gear unit.

In FIG. 5, attached to housing 1 of the gear unit is a plate cooler 52, to which oil is fed from the gear interior via one or more feed pipes 50, and is carried away via one or more discharge pipes 51. Preferably, the plate cooler includes a base plate having a groove recessed in a meander form, a cover plate being mounted on the base plate. Thus, the oil must flow through the plate cooler in meandering fashion. Alternatively, straight bores may also be realized in a base element and the oil conducted through the bores, deflection pieces being provided between the end areas of the bores on the base element.

On the rear side with respect to the side of the gear unit having the plate cooler, thus the side not visible in FIG. 5, a plate cooler 52 having the corresponding pipes may likewise be provided, so that a doubling of the cooling capacity is attainable.

Figure 6:
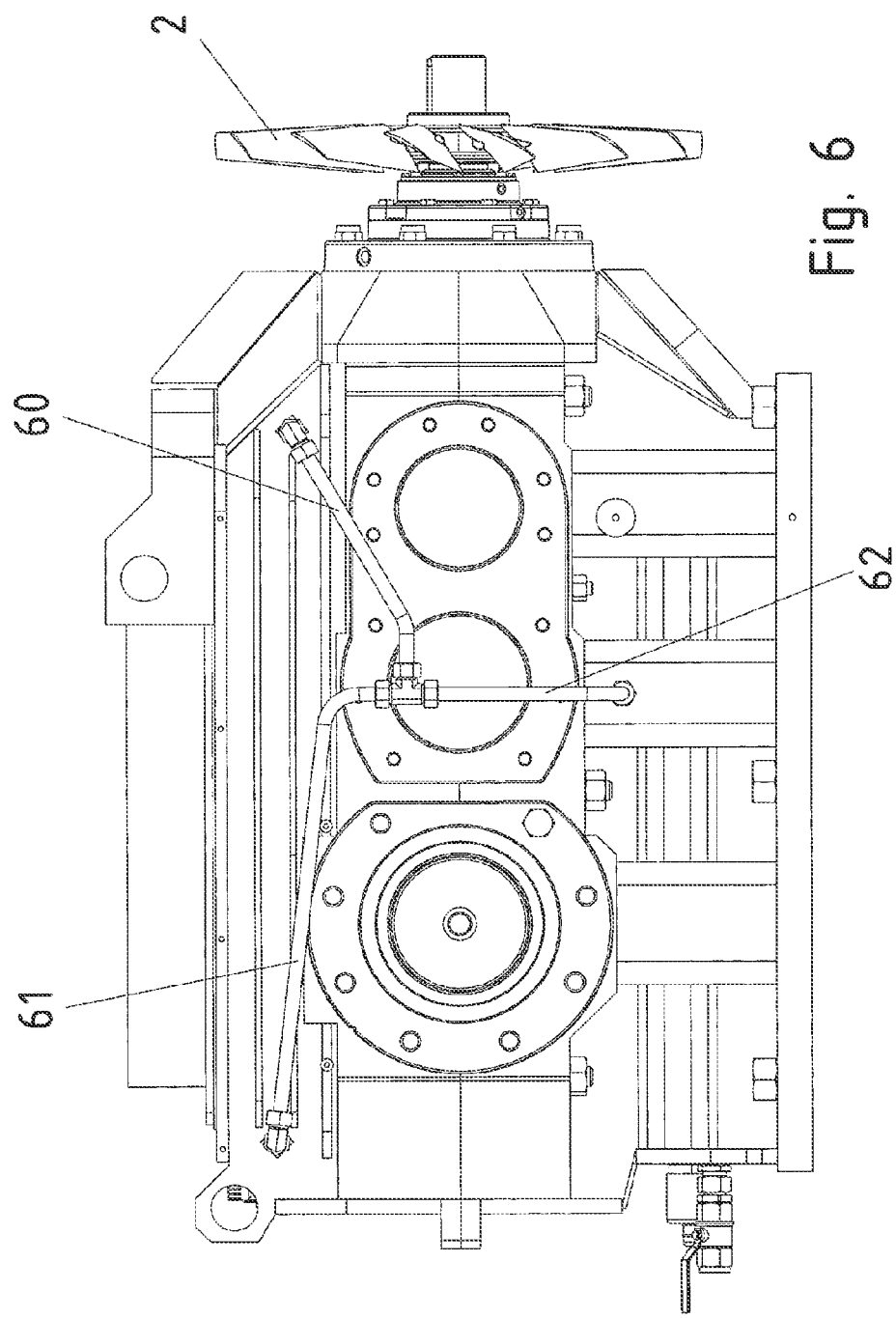
FIG. 6 shows another gear unit of an example embodiment of the present invention, in which oil lines brought out from the gear interior and brought in again are shown.

Plate cooler 52 is omitted in FIG. 6. Feed pipes 60 and 61 are brought together and lead into discharge pipe 62. Thus, the pipes are exposed directly to the cooling airflow, and particularly if oil flows through them slowly, sufficient cooling capacity may be attained, even without the expenditure of a cooling plate.

FIG. 7 shows that level 70 of the oil during operation is lowered compared to level 71 of the oil during standstill. Therefore, upon start-up of the gear unit, good lubrication is available immediately for all bearings, especially the bearings of the input gear stage or bearings 72 of one or more of the intermediate stages of the gear unit as well, since the oil level is so high that the bearings and gearing parts are situated sufficiently deep in the oil pan. Thus, good lubrication is present, even when the gear unit is started after long standstill times.

The input stage of the gear unit is realized as a right-angle gear stage. To that end, provided on the input shaft is a bevel pinion which meshes with a bevel wheel. Churning losses are reduced by a shell 73 for the bevel wheel and a shell 74 for the bevel pinion, which in each case are provided about the lower half of these gearing wheels, for shells (73, 74) are formed in such a way that at least in the area of shells (73, 74), the oil is substantially kept on a circular path during rotational movement of the gearing parts. Therefore, the inner area between the respective shell and gearing part is thus freed of oil, or at least the portion of oil is reduced substantially in this area.

Since shells (73, 74) basically surround only the lower half of the gearing parts, oil is only sprayed upwards. Therefore, during the flow-off impelled by gravity, the oil must cover long distances along the inner surface of the housing and/or along a delivery set-up, which means good heat dissipation from the oil to the gear housing is attainable. At their lower side, shells (73, 74) have at least one opening, so that oil from the oil pan is able to flow back into the spatial area between shell (73, 74) and the gearing part. However, the opening is so small that the oil flow into the spatial area is at least five times or at least ten times less than the oil flow which the gearing part is able to convey out of the spatial area when the nominal speed of the input shaft is reached during operation.

Shells (73, 74) are preferably in the shape of a half torus. As FIG. 8 shows more clearly, with the aid of the oil-delivery set-up described in greater detail below, during operation, oil is conveyed into a higher-situated temporary storage 80, so that the oil level drops. Because of this lowering of the oil level during operation, it is possible to reduce the churning losses. That is to say, the gearing parts engage only slightly within the oil pan, in particular, the rapidly rotating gearing parts, such as the gearing parts of the input gear stage and one or more intermediate gear stages, dip less deeply or not at all into the oil pan.

Temporary storage 80 has leakages or small openings otherwise provided, so that the temporary storage is emptied automatically. The openings are provided in such a way that the intended lowering of the oil level takes place during operation at nominal value, thus, the oil flow which streams into temporary storage 80 is greater than the oil flow which flows back from temporary storage 80 into the oil pan—at least so long as the oil level in the temporary storage is below a critical value.

Therefore, in operation, the temporary storage is thus filled with the aid of the oil-delivery arrangement, and consequently, with rising oil level in temporary storage 80, the oil level in the gear unit is lowered, especially in the oil pan, so that the power losses are reduced.

During operation, the bearings and gearings are lubricated in a manner that the oil squeezed out of the engaging gearings and/or sprayed is caught with the aid of baffle plates 92 and drips off from them into oil-conducting channels 93 that fill lateral collection pockets 90, from which at least a portion of the oil caught is supplied to the bearings to be lubricated and the gearing parts to be lubricated.

As FIG. 9 shows, to that end, collection pockets 90, situated on both sides in the gear unit, have drainage holes 91 for the bearing lubrication. The drainage holes discharge into bores in the housing, through which the oil is conducted to the bearing to be lubricated or via conducting channels to the respective gearing part to be lubricated.

Oil-conducting channels 93 are curved, so that a portion of the caught oil is conducted into a first, and another portion is conducted into the other collection pocket 90.

Lubrication of the gearing parts and the bearings of the output shaft is not always necessary, since these gearing parts rotate slowly and consequently produce only negligible churning losses. Therefore, dipping of these gearing parts and bearings into the oil pan is not harmful.

Preferably, baffle plates 92 and oil-conducting channels 93 are attached to the upper side of the gear housing.

The drainage holes are positioned in collection pockets 90 and the collection pockets are implemented such that the oil arriving first upon starting the gear unit is used to lubricate the bearings or gearing parts. Only when the caught oil flow exceeds this oil flow necessary for the lubrication is temporary storage 80 filled.

In a further exemplary embodiment, temporary storage 80 preferably has an adjustable overflow. To that end, an opening, envisaged in the horizontal direction, may be provided in a side wall of temporary storage 80 and may be covered by a sheet-metal cover part disposed in a manner allowing it to slide in the horizontal direction. The overflow level, and thus also the maximum volume of temporary storage 80, is therefore adjustable by the sliding of the sheet-metal cover part.

FIG. 10 illustrates a further oil-delivery device that shows a scraper 101 which scrapes off oil at an end face of a gear wheel and pushes it into pipe 100, from which lateral collection pockets 90 are able to be filled, as well. The previously described oil-delivery device, including oil-conducting channels 93, is additionally effective. In this manner, oil moving along on the gear wheel and sprayed around by the gear wheel is thus able to be caught and used to lubricate bearings or to lower the oil level in operation.

Scraper 101 together with pipe 100 are shown separately in FIG. 11. Here, it is more apparent that the scraper has a V-shaped recess, at whose pointed end, a borehole is provided, into which pipe 100 leads.

FIG. 12 shows the placement of scraper 101 on gear wheel 120.

FIG. 13 shows another gear unit in which, in contrast to the figures described above, instead of housing cover 4, a housing cover 130 is provided that is roof-shaped. Therefore, oil dripping off from the inner side of this roof-shaped housing cover is able to be led away by oil-conducting channels 93 into collection pockets 90. Thus, in this manner, it is not oil flung in the horizontal direction as in the case of the baffle plate, but rather oil flung in the vertical direction against the inner side of roof-shaped housing part 130 that is able to be caught and utilized.

FIG. 15 shows a housing cover 151 which is V-shaped, thus roof-shaped, the tip of the V pointing upward. In this case, the angle of the roof area, thus, the angle of the respective side of the V with respect to the horizontal is greater than 10°. Preferably, the angle is selected so that the drops sprayed onto the inside of the roof-shaped housing cover move downward laterally on the roof slope under the influence of gravity, in the course of which, they are bound adhesively to the roof, and then drip off into oil-conducting channels 93. The angle is thus always selected so that the gravitational force is less than the adhesive force for drops sticking adhesively to the surface. In this context, the angle is also substantially a function of the surface tension between oil and housing cover 151.

FIG. 13 also shows protection plate 131, which is used to protect ball bearings from oil sprayed around or from oil foam driven in the direction of ball bearings. Protection plate 131 is sufficiently wide that even several ball bearings are protectable, especially the ball bearing of the input shaft, of an intermediate shaft and/or of output shaft 7. Protection plate 131 is secured to the inner side of the housing, and is implemented with openings so large that the rotationally mounted parts belonging correspondingly to the respective ball bearings no contact with protection plate 131.

In FIG. 13, a distance sleeve is mounted between the gear wheel and the associated ball bearing on the shaft to maintain a defined distance between the ball bearing and gear wheel. Thus, the distance sleeve is provided in an opening in protection plate 131.

Protection plate 131 has an overflow 132, so that oil from the oil pan arrives in the area of the protected ball bearings when the oil level of the oil pan is higher than the overflow, thus, especially the overflow edge.

Protection plate 131 is welded or screw-fitted to the inner side of the housing, so that the ball bearings are in oil. Especially also in operation, thus, when the oil level in the oil pan falls, there is still a minimum oil level around the ball bearing. In this case, it is also further advantageous that the oil supplied to the gearing parts with the aid of the delivery device accumulates in the spatial area around the ball bearing, which is at least partially bounded by protection plate 131; a flow-off of the oil is also provided when the minimum oil level around the ball bearing exceeds overflow 132.

The implementation having protection plate 131 is shown in greater detail in FIG. 14. A lower and an upper protection plate 131 are used, the housing of the gear unit likewise being split into a lower and an upper housing part. Lower protection plate 131 is secured, especially screw-fitted, to the lower housing part, and upper protection plate 131 to the upper housing part, as shown in FIG. 14, or welded on, as in an alternative exemplary embodiment.

In an alternative exemplary embodiment, instead of protection plate 131, a ring inserted in a groove is provided, which therefore defines an overflow with the aid of the lowest encompassed point. The ring, then, is not able to represent a substantial splash protection, but is able to provide the function of the overflow.

In a further exemplary embodiment, an aforementioned protection plate is used in the case of a first bearing, and the aforementioned ring is used in the case of another bearing.

In the exemplary embodiment according to FIGS. 16, 17 and 18, the input right-angle gear stage is shown in greater detail. It is implemented as a bevel-gear stage.

A cup-shaped housing part 165 is screw-fitted to gear housing 160 at the axial end, to which, in turn, a flange part 167 is screw-fitted, that accommodates a shaft sealing ring 168 which seals off the gear interior from the outer surroundings.

In cup-shaped housing part 165, two tapered roller bearings 166, preloaded relative to each other, are provided in X-configuration, whose axial distancing from each other creates an interspace area 169. This interspace area 169 is thus bounded by the two tapered roller bearings 166 and cup-shaped housing part 165.

When the gear unit is not in operation, and therefore at high oil level, interspace area 169 is at least partially filled with oil, since it flows into it from the interior of the gear unit. During operation, the oil level of the oil pan in the gear unit is lowered. Interspace area 169 is emptied via a radial bore 170 which leads into interspace area 169 and which is closed at its outer radial end by a stopper 171. An axial bore 173 leads from radial bore 170 back into the interior of the gear unit. The positioning of the bores, especially the height provided relative to the oil pan, makes it possible to maintain a defined minimum oil level in interspace area 169. The emptying of interspace area 169, except for this minimum oil level, leads to a decrease in losses, since the bearings are then less surrounded by the oil.

A further interspace area 172 between tapered-roller bearing 166, situated axially further inside, and self-aligning roller bearing 162, via which the input shaft is supported in cup-shaped housing part 165, is emptied in analogous manner. For that purpose, radial bore 164 is provided, which opens through into an axially inwardly leading gap 163 that is situated between housing 160 of the gear unit and cup-shaped housing part 165, and widens axially further inwardly into a gap 161.

At its end area situated axially inside, the input shaft bears the bevel pinion, which meshes with a bevel wheel that is supported by bearings provided in housing 160 of the gear unit.

What is claimed is:

1. A gear unit, comprising:
    an input shaft;
    a bearing adapted to support the input shaft provided in a housing part of the gear unit; and
    a fan impeller provided on the input shaft;
    wherein at least one of (a) the housing part is beveled at least in a surface area adjacent to the fan impeller, the surface area being an exterior surface of the housing part that forms an exterior shape of the housing part exposed to an external environment of the housing part and (b) a beveled cowl is mounted on the housing part;
    wherein an air-guide containment is provided around the gear unit and surrounds the housing part by enveloping more than one side of the housing part; and
    wherein cooling fins are provided on at least one of (a) the beveled area of the housing part and (b) the cowl, the cooling fins directly projecting from a planar region of one of the exterior surface of the beveled area and the cowl at a non-zero angle with respect to a normal to a longitudinal axis of the input shaft.

2. The gear unit according to claim 1, wherein the beveled area of the housing part and/or the beveled cowl is arranged such that the housing part of the gear unit, with decreasing distance in an axial direction toward the fan impeller, has a cross-sectional area decreasing correspondingly, a normal of the cross-sectional area being selected in the axial direction.

3. The gear unit according to claim 1, wherein cooling fins are provided on the housing part of the gear unit.

4. The gear unit according to claim 1, wherein a housing cover which is tightly connectable to an area of the housing part and which has cooling fins on an outer side provided on the housing part of the gear unit.

5. The gear unit according to claim 3, wherein the cooling fins are aligned corresponding to a direction of a cooling airflow and are aligned in parallel relative to each other.

6. The gear unit according to claim 1, wherein an input gear stage is arranged as a right-angle gear stage.

7. The gear unit according to claim 1, wherein the air-guide containment is adapted to conduct a cooling airflow and, together with cooling fins and the housing part of the gear unit, to restrict, so that the cooling airflow absorbs heat output of the gear unit, the cooling airflow, starting from the fan impeller, being spread in conformance with the beveling and then blowing past along the housing part of the gear unit.

8. The gear unit according to claim 1, wherein the air-guide containment has passages for the input shaft and an output shaft, as well as for a floor mounting of the gear unit, the air-guide containment moreover having an opening for a sensor.

9. The gear unit according to claim 1, wherein a first pipe is adapted to conduct oil out of a gear-unit interior into an area of a cooling airflow, and a second pipe is adapted to return the oil to the gear-unit interior, the first and second pipes being arranged at least partially in the cooling airflow generated by the fan impeller.

10. The gear unit according to claim 9, wherein a part of the first pipe brought out of the interior of the gear unit is situated between the gear housing and the air-guide containment.

11. The gear unit according to claim 9, wherein the oil conveyed by the first pipe adapted to conduct oil out is fed to a plate cooler situated on the housing of the gear unit, in the cooling airflow, the second pipe adapted to return the oil conveying oil from the plate cooler back into the interior of the gear unit.

12. The gear unit according to claim 1, wherein an oil level of an oil pan of the gear unit is lower during operation than an oil level during long-term standstill of the gear unit, the gear unit including a temporary storage device adapted to lower the operational oil level.

13. The gear unit according to claim 1, wherein a temporary storage is provided to which oil is feedable from an oil pan of the gear unit, with the aid of a delivery device, the temporary storage being disposed in an interior of the gear unit, and being surrounded by the housing part of the gear unit.

14. The gear unit according to claim 13, wherein the temporary storage is arranged as a receptacle having openings of a kind that it is able to be emptied through these openings.

15. The gear unit according to claim 13, wherein the temporary storage is in the form of a receptacle that has openings and a delivery device is arranged such that a maximum oil flow delivered by the delivery device, during operation of the gear unit with a nominal speed of the gear unit, is greater than an oil flow returned from the temporary storage to the oil pan, effected through the openings.

16. The gear unit according to claim 13, wherein the temporary storage has a height-adjustable overflow, via which excess oil is drainable into the oil pan.

17. The gear unit according to claim 15, wherein the delivery device has a baffle plate adapted to catch oil, oil dripping off from the baffle plate being feedable via at least one of (a) a drainage channel and (b) a collection channel to the temporary storage.

18. The gear unit according to claim 17, wherein at least one of (a) the drainage channel and (b) the collection channel has an opening into which a pipe opens through, from which at least one of (a) a ball bearing and (b) a gearing is lubricatable.

19. The gear unit according to claim 17, wherein the drainage channel is curved, so that a first portion of oil dripped off from the baffle plate and caught by the drainage channel flows into a first collection channel, and a second portion of oil dripped off from the baffle plate and caught by the drainage channel flows into a second collection channel, the temporary storage being fillable from the collection channels, and the collection channels being disposed axially to a side of a gear wheel of the gear unit.

20. The gear unit according to claim 1, wherein at least one partial area of a gearing part of the gear unit is surrounded by a shell, so that oil is only allowed to spray upward, the shell having an opening at a lower side to permit the shell to be filled from an oil pan, when the gear unit is not in operation.

21. The gear unit according to claim 15, wherein the delivery device includes an oil scraper adapted to scrape off oil from an end face of a rotating gear wheel, and adapted to deliver scraped-off oil through a pipe to at least one of (a) the temporary storage and (b) a collection channel, the pipe being directed upwardly, the gear wheel being disposed so that it is at least partially submerged in the oil pan, and the oil scraper being situated above the oil pan.

22. The gear unit according to claim 21, wherein the pipe includes bores in the gear housing.

23. The gear unit according to claim 1, wherein a delivery device is adapted to convey oil from an interior of the gear unit through a pipe which is attached to an outside of the gear unit, the pipe adapted to return the oil to the interior of the gear unit.

24. The gear unit according to claim 23, wherein the pipe on the outside of the gear unit has a gradient, the oil from at least one of (a) a collection device, (b) a temporary storage, and (c) a collection channel disposed in the interior of the gear unit flowing outward through the pipe, and from there back again into an oil pan, the collection device being situated above the oil pan.

25. The gear unit according to claim 23, wherein the pipe provided on the outside is adapted to route oil to a plate cooler, and another part of the pipe is adapted to return oil from the plate cooler to the oil pan in the interior of the gear unit.

26. The gear unit according to claim 25, wherein the plate cooler is attached to the outside of the gear unit and is arranged in a cooling airflow.

27. The gear unit according to claim 21, wherein the oil scraper includes at least one of (a) an opening, (b) an inside space, and (c) a cavity, tapering in a moving direction of oil to be scraped from the end face of the rotationally mounted gear wheel, at whose end area the pipe is provided, into which the scraped-off oil is pushed.

28. The gear unit according to claim 21, wherein the pipe disposed on the oil scraper extends upwardly.

29. The gear unit according to claim 21, wherein an upper end of the pipe disposed on the oil scraper is connected one of (a) directly and (b) indirectly to a pipe adapted to bring the oil at least one of (i) out of the interior and (ii) connected to a temporary storage.

30. The gear unit according to claim 1, wherein a spatial area of the shaft bearing disposed in an opening of the gear housing is bounded at least partially with respect to an interior of the gear unit by a delimiting device that has an opening for the shaft supported in the bearing, a lowest point of the opening resulting in a minimum oil level in the spatial area of the bearing.

31. The gear unit according to claim 30, wherein the spatial area is bounded at least partially by the gear housing.

32. The gear unit according to claim 30, wherein the delimiting device includes at least one of (a) a protection plate and (b) a ring.

33. The gear unit according to claim 32, wherein the protection plate is at least one of (a) welded and (b) screw-connected to the housing.

34. The gear unit according to claim 32, wherein the ring is provided in a groove, extending around the housing of the gear unit.

35. The gear unit according to claim 1, wherein an opening encircles the input shaft as closely as possible, with a clearance of at least one of (a) less than 3 mm and (b) less than 1 mm.

36. The gear unit according to claim 32, wherein the protection plate is flat, and covers an area of an opening for a bearing.

37. The gear unit according to claim 1, wherein the housing of the gear unit includes a lower housing part and an upper housing part, a protection plate which substantially surrounds a lower half of the shaft being attached to the lower housing part, a further protection plate which substantially surrounds an upper half of the shaft being attached to the upper housing part.

38. The gear unit according to claim 1, wherein two bearings of the input shaft of the gear unit are provided in a substantially cup-shaped housing part, the housing part being screw-connected to the housing part of the gear unit.

39. The gear unit according to claim 1, wherein a first bearing is arranged as a bearing pair, a first interspace being formed in an axial direction between the paired individual bearings.

40. The gear unit according to claim 39, wherein a second bearing in an axial direction is set apart axially from the first bearing, so that a second interspace is formed.

41. The gear unit according to claim 1, wherein a first bearing of the input shaft is a pair of tapered-roller bearings, in an X-configuration, preloaded relative to each other, and a second bearing is a self-aligning roller bearing.

42. The gear unit according to claim 40, wherein at least one of (a) the first interspace and (b) the second interspace is connected by at least one bore to an interior of the gear unit, for the purpose of emptying.

43. The gear unit according to claim 40, wherein at least one of (a) the first interspace and (b) the second interspace is connected by a gap to an interior of the gear unit, for the purpose of emptying, the gap being formed between a substantially cup-shaped housing part and the housing part of the gear unit.

44. The gear unit according to claim 42, wherein at least one bore is arranged as a radial bore.

45. The gear unit according to claim 42, wherein at least one bore is arranged as an axially directed bore.

46. The gear unit according to claim 44, wherein the radial bore is plugged at an outer end by a stopper.

47. The gear unit according to claim 1, wherein an input shaft is sealed off by a shaft sealing ring from a substantially cup-shaped housing part.

48. The gear unit according to claim 42, wherein a level of a placement of the bore adapted to empty an interspace determines a minimum oil level for bearings of the input shaft.

49. A gear unit, comprising:
  an input shaft;
  a bearing adapted to support the input shaft provided in a housing part of the gear unit; and
  a fan impeller provided on the input shaft;
  wherein at least one of (a) the housing part is beveled at least in a surface area adjacent to the fan impeller, the surface area being an exterior surface of the housing part that forms an exterior shape of the housing part exposed to an external environment of the housing part, and (b) a beveled cowl is mounted on the housing part;
  wherein the beveled area of the housing part and/or the beveled cowl is arranged such that the housing part of the gear unit, with decreasing distance in an axial direction toward the fan impeller, has a cross-sectional area decreasing correspondingly, a normal of the cross-sectional area being selected in the axial direction;
  wherein first cooling fins are provided on at least one of (a) the beveled area of the housing part and (b) the cowl, the first cooling fins protecting directly from a planar region of one of the exterior surface of the beveled area and the cowl at a non-zero angle with respect to a normal to a longitudinal axis of the input shaft;
  wherein second cooling fins are provided on the housing part of the gear unit; and
  wherein a housing cover includes third cooling fins on an outer side provided on the housing part of the gear unit and connected to the at least one of (a) the beveled area of the housing part and (b) the cowl.

* * * * *